(12) United States Patent
Wasson

(10) Patent No.: US 6,386,648 B1
(45) Date of Patent: May 14, 2002

(54) MASTER CYLINDER AND BRAKE BOOSTER FOR A BRAKE SYSTEM

(75) Inventor: Andrew Paul Wasson, South Bend, IN (US)

(73) Assignee: Robert Bosch Corporation, Broadview, IL (US)

(*) Notice: Subject to any disclaimer, the term of this patent is extended or adjusted under 35 U.S.C. 154(b) by 0 days.

(21) Appl. No.: 09/698,304

(22) Filed: Oct. 27, 2000

(51) Int. Cl.[7] .................................................. B60T 8/44
(52) U.S. Cl. ................................ 303/114.3; 303/113.4; 303/113.3; 60/589
(58) Field of Search ........................... 303/113.4, 113.3, 303/113.5, 114.1, 115.1, 114.2, 114.3; 60/589, 562, 547.1

(56) References Cited

U.S. PATENT DOCUMENTS

| | | | | |
|---|---|---|---|---|
| 4,434,619 A | * | 3/1984 | Kobayashi | 60/547.1 |
| 4,458,490 A | * | 7/1984 | Newhouse | 60/547.1 |
| 4,576,004 A | * | 3/1986 | Bach | 60/547.1 |
| 4,703,978 A | * | 11/1987 | Belart et al. | 303/52 |
| 4,776,645 A | * | 10/1988 | Seibert et al. | 303/113.1 |
| 4,826,255 A | * | 5/1989 | Volz | 303/10 |
| 4,826,258 A | * | 5/1989 | Ocvirk et al. | 303/119.1 |
| 4,922,120 A | * | 5/1990 | Becker et al. | 303/114.1 |
| 4,932,727 A | * | 6/1990 | Wagner et al. | 303/114.1 |
| 4,966,420 A | * | 10/1990 | Schiel et al. | 303/114.1 |
| 5,000,525 A | * | 3/1991 | Reinartz et al. | 303/116.1 |
| 5,015,044 A | * | 5/1991 | Kircher et al. | 303/114.1 |
| 5,096,267 A | * | 3/1992 | Volz | 303/113.1 |
| 5,133,592 A | * | 7/1992 | Wagner et al. | 303/114.1 |
| 5,141,295 A | * | 8/1992 | Burgdorf et al. | 303/113.1 |
| 5,181,769 A | * | 1/1993 | Schiel et al. | 303/114.3 |
| 5,359,854 A | * | 11/1994 | Wagner et al. | 60/535 |
| 5,496,099 A | * | 3/1996 | Resch | 303/114.1 |

\* cited by examiner

*Primary Examiner*—Paul N. Dickson
*Assistant Examiner*—Devon Kramer
(74) *Attorney, Agent, or Firm*—Leo H. McCormick, Jr.; Warren Comstock

(57) ABSTRACT

A brake system for (10) a vehicle having a brake booster (14a) with an output put rod (152a) for providing a primary piston (310) in a master cylinder (12a) with an input force to pressurize fluid which is supplied to wheel brakes (10a) of a vehicle to effect a brake application in response to an operator input force. The master cylinder (12a) has a first housing (202a) with a bore (202a) therein for retaining the primary piston (310) in a first pressure chamber (212a). The bore (202a) has a first compensation passage (206a) connected to a fluid supply (204a) and an outlet port (218) connected to the wheel brakes (10a). The primary piston (310) has a first position of rest whereby the first pressure chamber (212a) is connected to a fluid supply (204a) through the first compensation passage (206a). The brake booster (14a) has a second housing (102,104) with an interior separated by a movable wall (122) into a front chamber (108) and a rear chamber (110). A first return spring (160a) urges the movable wall (122) to a second position of rest whereby the front chamber (108) and rear (110) chamber are connected to a first source of fluid pressure. A control valve (142) responsive to the operator input force connects the rear chamber (110) with a second fluid pressure to create a pressure differential across the movable wall (122). The pressure differential acts on the movable wall (122) to develop an operational force which overcomes the first return spring (160a) and provides the primary piston (310) with an input force to move the primary piston (310) past the compensation passage (206a) and thereafter pressurize fluid in the first chamber (212a) to effect a brake application. The brake system (10) is characterized by fixing the primary piston (310) to the output push rod (152a) such that the primary piston (310) is moved to the first position of rest by the first return spring (160a) returning the movable wall (122) to the second position of rest in an absence of an operator input being applied to the control valve (142).

17 Claims, 3 Drawing Sheets

MASTER CYLINDER AND BRAKE BOOSTER FOR A BRAKE SYSTEM

This invention relates to a master cylinder having a primary piston fixed to an output push rod retained in a movable wall of a brake booster and moved to a position of rest in a bore of the master cylinder by a return spring which moves the movable wall of the brake booster to a position of rest position in the brake booster in an absence of an operator input being applied to a control valve to effect a brake application. With the primary piston in the position of rest, a supply of fluid retained in a reservoir is made available to compensate for any fluid loss in a brake system.

BACKGROUND OF THE INVENTION

In tandem master cylinders, a single bore in a housing usually retains a primary piston and a secondary piston. A first spring arrangement separates the primary piston from the secondary piston to define a first chamber within the bore while a second spring arrangement separates the secondary piston from a end wall of the bore to define a second chamber. An input force applied to the primary piston after overcoming the secondary spring arrangement moves the primary piston, first spring arrangement and secondary piston to close communication between compensation passages and the bore and thereafter pressurize fluid in the first and second chambers. The pressurized fluid is supplied to the wheels brakes to effect a brake application. On termination of the input force on the primary piston, the first and second spring arrangements move the primary and secondary pistons in a position of rest. In this position of rest, communication is established between a fluid supply retained in a reservoir and the first and second chambers to compensate for any losses of fluid that may occur in a brake system. The following U.S. Pat. Nos. 3,149,468, 5,161,375, 5,279,125, and 5,943,863 are illustrative examples of the above described master cylinder.

The master cylinders disclosed in the above identified patents function in an adequate manner to provide pressurized fluid to a brake system for effecting a brake application. However, recent efforts have been made to reduce the cost of a master cylinder through the use of light weight metal materials for the master cylinder housing and plastic material for the primary and secondary pistons. Unfortunately such changes have not reduced the number of components needed to manufacture a master cylinder and as a result the time of manufacture a master cylinder did not change.

SUMMARY OF THE INVENTION

A primary object of the present invention is to eliminate a caged spring assembly which separates a primary piston from a secondary piston in a master cylinder by fixing the primary piston of the master cylinder to an output push rod of a brake booster and utilize a return spring which moves a movable wall of the brake booster in a positions of rest to locate the primary piston in the master cylinder and define a primary pressure chamber within the bore while opening communication between the bore and primary pressure chamber in a position of rest.

In more particular detail, the brake system for a vehicle includes the brake booster which provides the primary piston in the master cylinder with an input force to pressurize fluid in a first or primary pressure chamber. This pressurized fluid is supplied to wheel brakes of a vehicle to effect a brake application in response to an operator input force. The master cylinder has a first housing with a bore therein having corresponding first and second compensation ports connected to a fluid supply in a reservoir and first and second outlet ports connected to the wheel brakes. The primary piston is located in the bore and with a secondary piston defines the first pressure chamber there between while a spring urges the secondary piston into engagement with a stop to define a second pressure chamber therein. With the primary and secondary pistons in a position of rest, the first and second chambers are connected through compensation ports to the fluid supply available in the reservoir to compensate the brake system with any fluid loss that may occur in the brake system. The brake booster has a second housing with an interior separated by a movable wall into a front chamber and a rear chamber. The front chamber is connected to a first fluid which has a first pressure (vacuum) while the rear chamber is selectively connected to the first fluid and to a second fluid at a second pressure (atmospheric pressure) as a function of an input force applied a control valve. A return spring located in the second housing urges the movable wall toward a position of rest whereby the first fluid pressure (vacuum) is communicated to the front and rear chambers through the control valve. The control valve is responsive to an operator input for terminating communication of the first fluid pressure to the rear chamber and initiating communication of the second fluid to the rear chamber to create an pressure differential across the movable wall. The pressure differential acts on the movable wall to develop an operational force, which after overcoming the return spring, moves the movable wall from the position of rest toward the master cylinder. The operational force is communicated from the movable wall through a reaction member and into the output push rod to provide the primary piston with an operational input. The primary piston moves from its position of rest past to interrupt communication between the bore and compensation port and thereafter pressurize fluid in the first pressure chamber. The pressurized fluid from the first pressure chamber is supplied from the first pressure chamber to wheel brakes through a first outlet port to initiate a brake application. The pressurized fluid present in the first pressure chamber also acts on the secondary piston and after overcoming its return spring pressurizes fluid in the second pressure chamber. The pressurized fluid from the second pressure chamber is communicated through a second outlet port to wheel brakes to assist in effecting the brake application. The brake system is characterized a connecting means which joins the primary piston of the master cylinder with the output push rod of the brake booster such that the primary piston is moved toward its position of rest by the return spring returning the movable wall of the brake booster to its position of rest in an absence of an operator input being applied to the control valve.

An advantage of the brake system resides in the master cylinder and brake booster combination wherein a return spring for the brake booster moves both a primary piston in the master cylinder and movable wall of the booster to a position of rest.

A further advantage of the brake system resides in a connection whereby a primary piston in a master cylinder is fixed to an output rod of a movable wall in a brake booster and movement of the wall in respond to a pressure differential across the movable wall simultaneously moves the primary piston to pressurize fluid in a master cylinder to effect a brake application.

A still further advantage of the brake system resides in fixing a primary piston in a master cylinder to an output push rod of a brake booster to tie movement of the primary piston with the movement of a movable wall in the brake booster.

DETAILED DESCRIPTION

Figure 1:
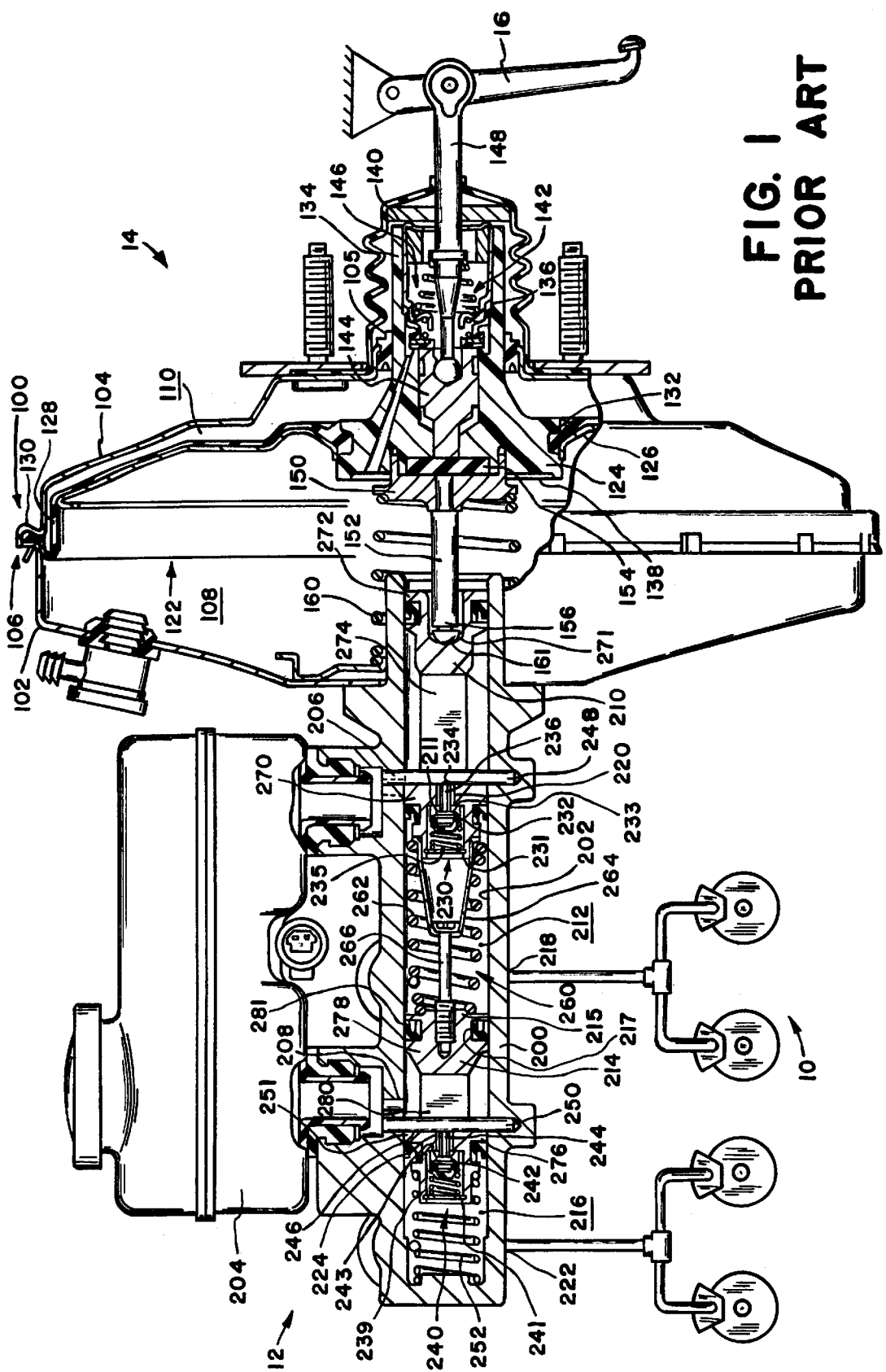
FIG. 1 is a schematic illustration of a brake system with a sectional view of a typical prior art master cylinder and brake booster.

The brake system 10 shown in FIG. 1 includes a master cylinder 12 and a brake booster 14 which respond to an input force applied to a pedal 16 by an operator to supply wheel brakes with pressurized fluid to effect a brake application.

The brake booster 14 is of a type having a housing 100 defined by a front shell 102 joined to a rear shell 104 by a twist lock arrangement 106. The interior of the housing 100 is divided into a front chamber 108 and a rear chamber 110 by a movable wall 122. The movable wall 122 is defined includes a hub member 124 with a backing plate 126 attached thereto and a diaphragm 128. The diaphragm 128 has a first bead 130 held by the twist lock arrangement and a second bead 132 located in a groove on the peripheral surface of hub member 124 to seal the front chamber 108 from the rear chamber 110. Hub member 124 has a cylindrical body 134 with bore 136 which extends from a first end 138 to a second end 140. The second end 140 of the cylindrical body 134 passes through an opening 105 in the rear shell 104 to communicate atmospheric air from the surrounding environment to bore 136. A control valve 142 which includes a plunger 144 and a popped member 146 is retained in bore 136 and connected to push rod 148 for receiving input from brake pedal 16. Hub member 124 receives head 150 of an output push rod 152 to position reaction disc 154 adjacent plunger 144. A shaft 156 of the output push rod 152 has an adjustment member 161 on the end thereof to adjust the length thereof to establish an engagement point with the primary piston 210 of master cylinder 12. A return spring 160 located in the front chamber 108 acts on head 150 of the push rod 152 to urge the movable wall 122 to a position of rest adjacent rear shell 104 in an absence of an input force being applied to brake pedal 16.

The master cylinder 12 is of a type fully declassed in U.S. Pat. No. 5,279,125 wherein a housing 200 has a bore 202 connected to a reservoir 204 through first 206 and second 208 compensation ports. A primary piston 210 is located in bore 202 to define a first pressure chamber 212 and a secondary piston 214 is located in bore 202 to define a second pressure chamber 216 in housing 200. The first pressure chamber 212 is connected to a brake system through outlet port 218 and to reservoir 204 through a passageway 220 in the primary piston 210. The second pressure chamber 216 is connected to the brake system through an outlet port 222 and to the reservoir 204 through a second passageway 224 in the secondary piston 214. A first valve 230 retained in the primary piston 210 by a snap ring 235 has head 232 with a stem 234 attached thereto which is urged toward a seat 233 surrounding opening or passage 220 by a spring 231. Stem 234, which is located in passageway 220 of the primary piston 210 has ribs 236 thereon to provide a flow path between cross bore or slot 274 such that the first pressure chamber 212 is connected to reservoir 204. A second valve 240 retained in the secondary piston 214 by a snap ring 241 has head 242 with a stem 244 attached thereto which is urged toward a seat 243 surrounding opening or passageway 224 by a spring 239. Stem 244, which is located in passageway 224 of the secondary piston 214, has ribs 246 thereon to provide a flow path between the cross bore or slot 280 such that the secondary pressure chamber 216 is connected to reservoir 204. A first pin 248 attached to housing 200 and extending through slot 274 in the primary piston 210 forms a stop to retain the primary piston 210 within bore 202. A second pin 250 attached to housing 200 and extending through slot 280 in the secondary piston forms a stop to retain the secondary piston 214 within bore 202.

A return spring 252 located in the bottom of bore 202 urges an end or wall 276 of the secondary piston 214 toward stop pin 250. When wall 276 of the secondary piston 214 approaches stop pin 250 as shown in FIG. 1, stem 244 also engages stop pin 250 to position head 242 away from face seat 243 and allow communication of fluid from reservoir 204 into chamber 216 through the flowpath defined by compensation port 208, bore 202 and slot 280.

A caging arrangement 260 which includes a return spring 262, a retainer 264 and a bolt 266 is located in bore 202 between the secondary piston 214 and primary piston 210 to define limits for the first or primary pressure chamber 212. Bolt 266 extends through retainer 264 and is connected to the secondary piston 214. Return spring 262 acts on retainer 264 to urge the primary piston 210 toward stop pin 248. When the primary piston 210 engages stop pin 248, stem 234 engages stop pin 248 to position head 232 away from face seat 233 to allow communication of fluid from reservoir 204 into chamber 212 through a pathway defined by compensation port 206, bore 202 and slot 274.

The primary piston 210, as shown in FIG. 1 is essentially a cylindrical body having a first end 270 spaced from a second end 272 with a slot 274 there between. The first 270 and second 272 ends have a first diameter which is substantially equal to bore 202 while the central portion that contains slot 274 consists of a smaller second diameter section. Opening or passage 220 in the first end 270 connects the pressure chamber 212 with slot 274 and is located along an axially center line of the first end 270 of the cylindrical body while the second end 272 has a spherical indentation 271 for receiving adjustment member 161 attached to the end of shaft 154 of the output push rod 152 extending from the brake booster 14.

Similarly, the secondary piston 214, as shown in FIG. 1 is essentially a cylindrical body with a first end 276 spaced from a second end 278 with a slot 280 there between. The first 276 and second 278 ends have a first diameter which is substantially equal to bore 202 while the portion in which slot 280 is located has a smaller second diameter. Opening or passage 224 for connecting pressure chamber 216 is located along an axially center line of the first end 276 of the cylindrical body while the second end 278 of the cylindrical body has a shoulder 215 for receiving return spring 262, a groove 217 for receiving a seal 281 and a threaded opening for receiving a bolt 266.

The length of the stroke of the primary piston 210 within bore 202 is defined by the engagement of the primary piston 210 with the secondary piston 214 whereas the stroke of the secondary piston 214 within bore 202 is limited by the engagement of the secondary piston 214 with the bottom of the bore 202. It being understood that the length of axial slot 274 is about twice as long as axial slot 280 to provide for pressurization of fluid in primary pressure chamber 212 should the secondary pressure chamber 216 become inoperative through a failure in that portion of the brake system.

The brake system 10 is placed in operation when an operator desires to make a brake application and applies a force to pedal 16. The force from pedal 16 is communicated to control valve 142 which initially terminates communication of the first fluid between the front chamber 108 and rear chamber 110 and allows air from the atmosphere to be communicated to the rear chamber 110 to create a pressure differential across movable wall 122. The pressure differential acts on the movable wall 122 and after overcoming the force of return spring 160 moves the movable wall 122 from a position of rest toward the front shell 102. Movement of the movable wall 122 is communicated through reaction disc 154 into output push rod 152 as an operational force for moving the primary piston 210 in master cylinder 12. Initially, the primary piston 210 and secondary piston 214 simultaneous move away from corresponding stop pins 248 and 250 toward the secondary pressure chamber 216. With such movement by the primary 210 and secondary 214 pistons, spring 231 moves head 232 into engagement with seat 233 to close communication between chamber 212 and reservoir 204 by way of passageway 220 and spring 239 moves head 242 into engagement with seat 243 to close communication between chamber 216 and reservoir 204 by way of passageway 224. Thereafter, the operational force communicated through push rod 152 moves the primary piston 210 and secondary piston 214 to respectively pressurize fluid in the first pressure chamber 212 and second pressure chamber 216 with the pressurized fluid being communicated to the wheel brakes to effect a brake application.

On termination of the input force on the brake pedal 16 by an operator, control valve 142 is repositioned to terminate communication of the second pressure (atmospheric air) to the rear chamber 110 and reconnect the rear chamber 110 to receive the first fluid pressure (vacuum) to terminate the pressure differential across the movable wall 122. On termination of the pressure differential, return spring 160 moves the movable wall 122 to the position of rest in the brake booster 14. On termination of the operational force acting on the primary piston 210, return spring 252 acts on the secondary piston 214 to move secondary piston 214 and primary piston 210 toward the corresponding stop pins 250 and 248. As the secondary piston 214 approaches stop pin 250, stem 244 engages stop pin 250 to move head 242 off seat 243 and open communication between chamber 216 and compensation fluid available in reservoir 204. At the same time return spring 262 moves the primary piston 210 toward stop pin 248 to bring stem 234 into engagement with stop pin 248 to move head 232 off seat 233 and open communication between chamber 212 and supply fluid available in reservoir 204. When primary piston 210 engages stop pin 248, a position of rest is defined for the primary piston 210 and secondary piston 214 within bore 202. It should be noted that in the position of rest, the secondary piston 214 does not engage the stop pin 250 as return spring 262 has a slightly larger force than return spring 252 to provide for the simultaneous movement thereof in response to an operational force transmitted by the output push rod 152.

In an event of a failure of in the secondary pressure chamber 216, movement of the primary piston 210 moves the secondary piston 214 in the secondary pressure chamber 216 until the second end 278 engages stop pin 250. Thereafter movement of the primary piston 210 pressurizes fluid in chamber 212 to effect a brake application. It should be understood In this situation, the force of return spring 262 places a reduction on the limit on the development of pressurized fluid available for effecting a brake application.

Figure 2:
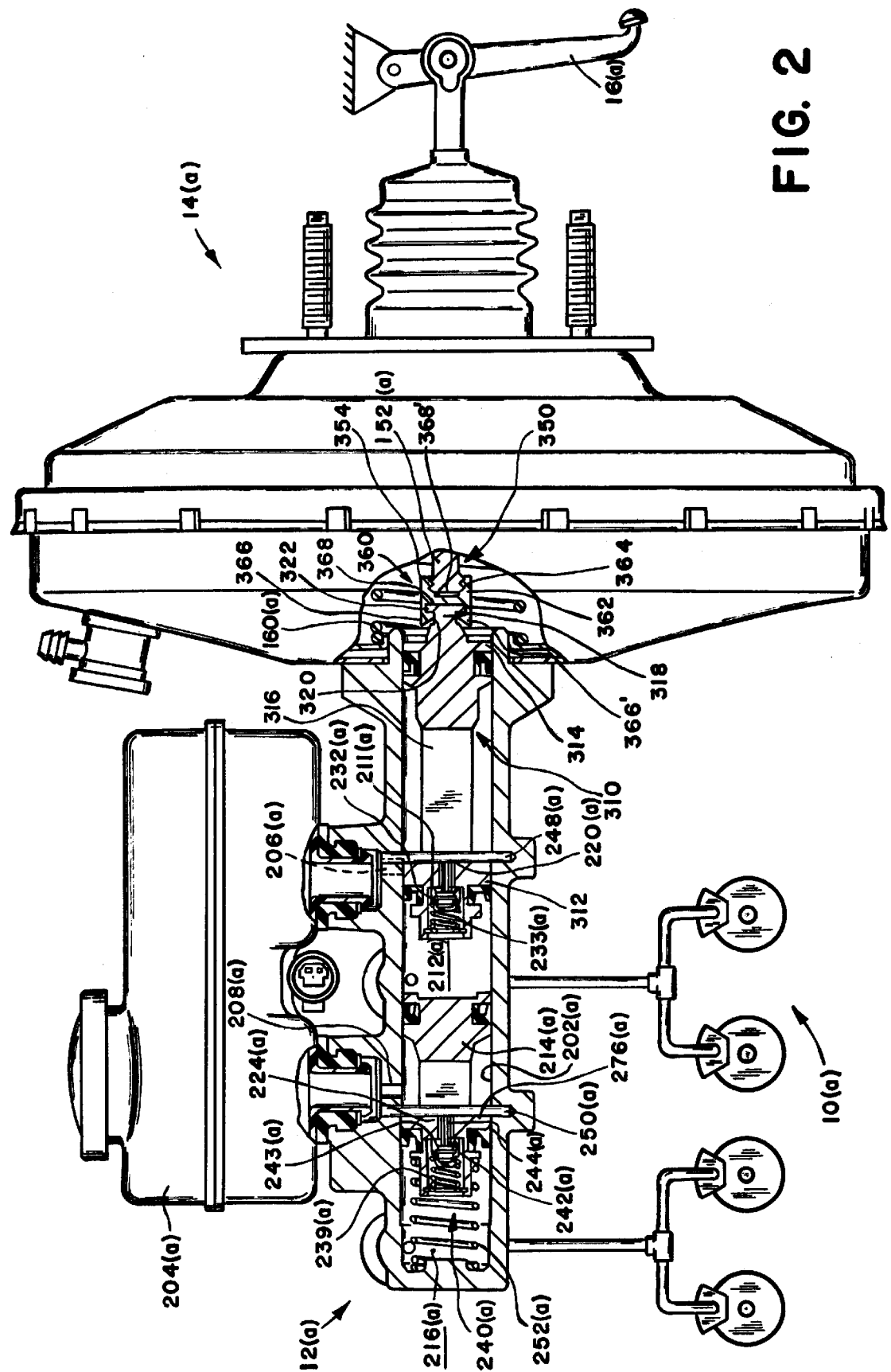
FIG. 2 is schematic illustration of a brake system with a sectional view of a master cylinder and brake booster made according to the principals of the present invention wherein a primary piston in the master cylinder is fixed to an output push rod connected to a movable wall in the brake booster and correspondingly moves as a direct function of movement of the movable wall.

A preferred embodiment of the present invention in a brake system is shown in FIG. 2 with additional embodiments for master cylinders illustrated in FIGS. 3, 4, 5 and 6. Like components for all of the embodiments are identified with the same reference number and where an operational function for a component is identical no further description of the component is provided but a subscript "a", "b", "c", "d" or "e" may be added to provide a clearer understanding of the relationship of the components.

In FIG. 2, a brake system 10a is illustrated for a master cylinder 12a and brake booster 14a wherein caging arrangement 260 for master cylinder 12 has been eliminated and the primary piston 310 of the master cylinder 12a is fixed to the output push rod 350 of the brake booster 14a by a connection arrangement 360. Return spring 160a for brake booster 14a acts on movable wall 122a for urging the primary piston 310 in bore 202a toward a position of rest in an absence of an input force being applied to brake pedal 16a.

In more particular detail, the primary piston 310 essentially has a cylindrical body with a first end 312 spaced from a second end 314 with a slot 316 located there between. The first 312 and second 314 ends have a first diameter which is substantially equal to bore 202a while that portion containing slot 316 consists of a smaller second diameter. Engagement of the end of the cylindrical body surrounding a slot 316 with stop pin 248 defines a length of stroke for the primary piston 310 within bore 202a. Opening or passage 220a for connecting pressure chamber 212a is located along an axially center line of the first end 312 of the cylindrical body. The second end 314 has an axial tapered spherical projection 318 that merges into a cylindrical section 320 adjacent a rib or rim 322.

The output push rod 350 has a shaft 152a with threads 354 on the end thereof to accommodate corresponding threads 364 of connection arrangement 360. The connection arrangement 360 has a cylindrical body 362 with a plurality of resilient axial hooks 366,366' that extend from a base 368. The connection arrangement 360 is screwed onto the end of shaft 152a until base 368 engages the end of shaft 152a. In some instances it may be necessary to provide a shim 368' in the bottom of threaded bore 364 to adjust the length of the output push rod 350 to position the primary piston 310 in a desired position of rest as later described.

During manufacture when the master cylinder 12a is joined to the brake booster 14a, the output push rod 350 is fixed to the primary piston 310 by pushing the axial hooks 366,366' onto or over rib or rim 322 such that when rim hooks 366,366' engages base 368, the axial hooks 366,366' snap into cylindrical section 320. The return spring 160a in the brake booster is designed to act on head 150a of the output push rod 350 to move the movable wall 122a to a position of rest.

Mode of Operation

When an operator desires to effect a brake application, an input force is applied to brake pedal 16a which operates control valve 142a to create a pressure differential across the movable wall 122a. The pressure differential acts on the movable wall 122a to develop an operational force which after overcoming the force of return spring 160a moves the movable wall 122a toward the front chamber 108a. The operational force is communicated into reaction disc 154a to the output put push rod 350. Initial movement of the output push rod 350 moves primary piston 310 away from stop pin 248a to allow spring 233a to move head 232a into engagement with seat 211a and begin development of pressurized fluid in the first pressure chamber 212a. As the pressure of the fluid in the first pressure chamber 212a increases, the force of return spring 252a is overcome and the secondary piston 214a moves away from stop pin 250a to thereafter allow spring 239a to move head 242a into engagement with seat 243a to close communication between chamber 216a and reservoir 204a by way of passageway 224a. Thereafter, the operational force supplied through the output push rod 350 moves the primary piston 310 and secondary piston 214a to respectively pressurize fluid in chambers 212a and 216a to effect a brake application corresponding to the operator input force applied to brake pedal 16a.

On termination of the input force on the brake pedal 16a by an operator, control valve 142a is repositioned to terminate communication of the second pressure (atmospheric air) to the rear chamber 110a and reconnect the rear chamber 110a to receive the first fluid pressure (vacuum) to terminate the pressure differential across the movable wall 122a. On termination of the pressure differential, return spring 160a moves the movable wall 122a to the position of rest in the brake booster 14a as shown in FIG. 2. The primary piston 310 is fixed to the output push rod 350 on which return spring 160a acts and moves the movable wall 122a to its position of rest and as a result the primary piston 310 is also moved to its position of rest by the action of return spring 160a. As the primary piston 310 approaches its position of rest, stem 234a engages stop pin 248a to move head 232a off seat 211a and open communication between the first pressure chamber 212a and compensation fluid available in reservoir 204a. As the pressure in the first pressure chamber 212a is lowered, return spring 252a acts on the secondary piston 214a to move secondary piston 214a toward stop pin 250a to bring stem 244a into engagement with stop pin 250a and move head 242a off seat 243a to open communication between chamber 216a and compensation fluid available in reservoir 204a. In this operation, the first end 276a of piston 214a actually is held against the stop pin 250a and as a result to such that the length of stem 244a may be reduced by an amount equal to a gap that was present in the prior art resulting from a difference in strength of return spring 252 and caged spring 262. Thus, any initial delay in the movement of the secondary piston 214a caused by the development of the fluid pressure in the primary chamber 212a as compared with movement of the primary piston 310 can be compensated for by the reduction in movement required to close of passage 224a by the second valve 240a.

Figure 3:
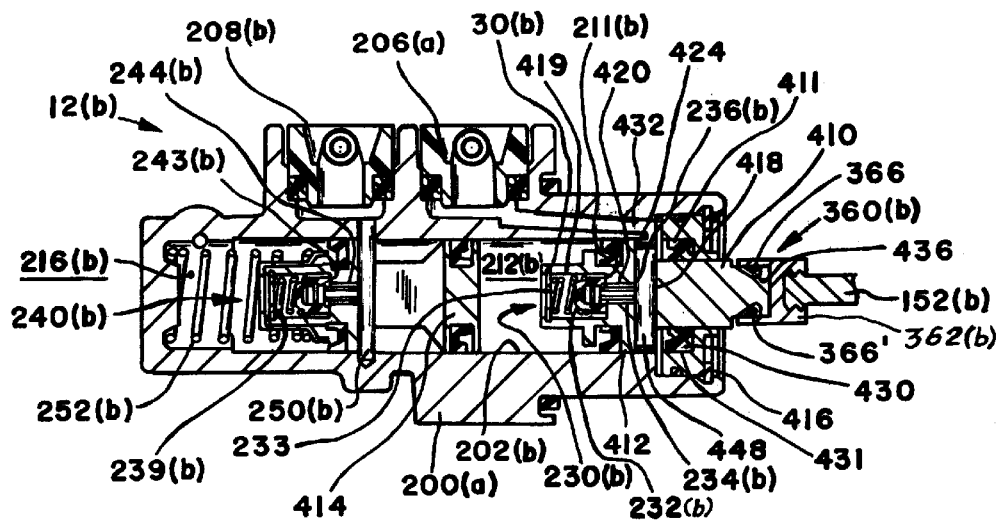
FIG. 3 is a sectional view of an another embodiment of a master cylinder of the present invention for use in the brake system of FIG. 2.

FIG. 3 is a sectional view of a master cylinder 12b for use in the brake system 10a of FIG. 2 wherein the master cylinder 12b is recessed into the front chamber 108a of the brake booster 14a to provide a more compact unit. In this master cylinder 12b, the components are similar to the structure disclosed in U.S. Pat. No. 5,279,125 with exception of the elimination of the resilient means which separates the primary piston 410 from the secondary piston 414 and the solid connection between the primary piston 410 and the output push rod 152b. In this embodiment, the primary piston 410 has essentially a cylindrical body 412 which is retained in a bearing seal arrangement 411 held in the housing 200a by a snap ring 416. The cylindrical body 412 has a diameter which is approximately equal position of rest and as a result the primary piston 310 is also moved to its position of rest by the action of return spring 160a. As the primary piston 310 approaches its position of rest, stem 234a engages stop pin 248a to move head 232a off seat 211a and open communication between the first pressure chamber 212a and compensation fluid available in reservoir 204a. As the pressure in the first pressure chamber 212a is lowered, return spring 252a acts on the secondary piston 214a to move secondary piston 214a toward stop pin 250a to bring stem 244a into engagement with stop pin 250a and move head 242a off seat 243a to open communication between chamber 216a and compensation fluid available in reservoir 204a. In this operation, the first end 276a of piston 214a actually is held against the stop pin 250a and as a result to such that the length of stem 244a may be reduced by an amount equal to a gap that was present in the prior art resulting from a difference in strength of return spring 252 and caged spring 262. Thus, any initial delay in the movement of the secondary piston 214a caused by the development of the fluid pressure in the primary chamber 212a as compared with movement of the primary piston 310 can be compensated for by the reduction in movement required to close of passage 224a by the second valve 240a.

FIG. 3 is a sectional view of a master cylinder 12b for use in the brake system 10a of FIG. 2 wherein the master cylinder 12b is recessed into the front chamber 108a of the brake booster 14a to provide a more compact unit. In this master cylinder 12b, the components are similar to the structure disclosed in U.S. Pat. No. 5,279,125 with exception of the elimination of the resilient means which separates the primary piston 410 from the secondary piston 414 and the solid connection between the primary piston 410 and the output push rod 152b. In this embodiment, the primary piston 410 has essentially a cylindrical body 412 which is retained in a bearing seal arrangement 411 held in the housing 200a by a snap ring 416. The cylindrical body 412 has a diameter which is approximately equal to bore 202b and a slot 418 which extends through the cylindrical body 412 adjacent a shoulder 424. An axial passageway 420 connects slot 418, which retains a stop pin 448, with the first pressure chamber 212b. A first valve 230b is retained in a bore 419 of the primary piston 410 by a snap ring 30b. The first valve 230b has head 232b with a stem 234b attached thereto which is urged toward a seat 211b surrounding opening or passage 420 by a spring 233b while a stem 234b that extends from head 232b is located in passageway 420 of the primary piston 410. Stem 234b has a plurality of ribs 236b thereon to provide a flow path between cross bore or slot 418 such that the first pressure chamber 212b is connected to reservoir 204b. A lip seal 430 is located in a groove 431 on the primary piston 410 adjacent shoulder 424 to seal chamber 212b from compensation passageway 432 connected to reservoir 204b of master cylinder 12b. The cylindrical body 412 has a groove 436 for receiving hooks 366,366' on connection arrangement 360b of output push rod 152b extending from a brake booster 14b.

The operation of master cylinder 12b is similar with the embodiment of master cylinder 12a described with respect to FIG. 2 wherein initial movement of the output push rod 152b moves primary piston 410 and stop pin 448 away the bearing seal arrangement 411 to allow spring 233b to move head 232b into engagement with seat 211b and begin development of pressurized fluid in the first pressure chamber 212b. As the pressure of the fluid in the first pressure chamber 212b increased, the force of return spring 252b is overcome and the secondary piston 414 moves away from stop pin 250b to thereafter allow spring 239b to move head 242b into engagement with seat 243b to close communication between chamber 216b and reservoir 204b by way of passageway 224b. Thereafter, the operational force supplied through the output push rod 152b moves the primary 410 and secondary 414 pistons to respectively pressurize fluid in chambers 212b and 216b to effect a brake application corresponding to the operator input force applied to brake pedal 16b.

On termination of the input force on the brake pedal 16b by an operator, control valve 142b is positioned to terminate communication of the second pressure (atmospheric air) to the rear chamber 110b and reconnect the rear chamber 110b to receive the first fluid pressure (vacuum) to terminate the pressure differential across the movable wall 122b. On termination of the pressure differential, return spring 160b moves the movable wall 122b to the position of rest in the brake booster 14 as shown in FIG. 2. The primary piston 410 being fixed to the output push rod 360b on which return spring 160b which acts to move the movable wall 122b to its position of rest is also located in its position of rest by the action of return spring 160b. As the primary piston 410 approaches its position of rest, stop pin 448 engages the bearing seal arrangement 411 and moves stem 234b off seat 211 to allow fluid to in passageway 424 to open communication between the first pressure chamber 212b and compensation fluid available in reservoir 204b. As the pressure in the first pressure chamber 212b is lowered, return spring 252b acts on the secondary piston 414 to move secondary piston 414 toward stop pin 250b to bring stem 244b into engagement with stop pin 250b and move head 242b off seat 243b to open communication between chamber 216b and compensation fluid available in reservoir 204b.

Figure 4:
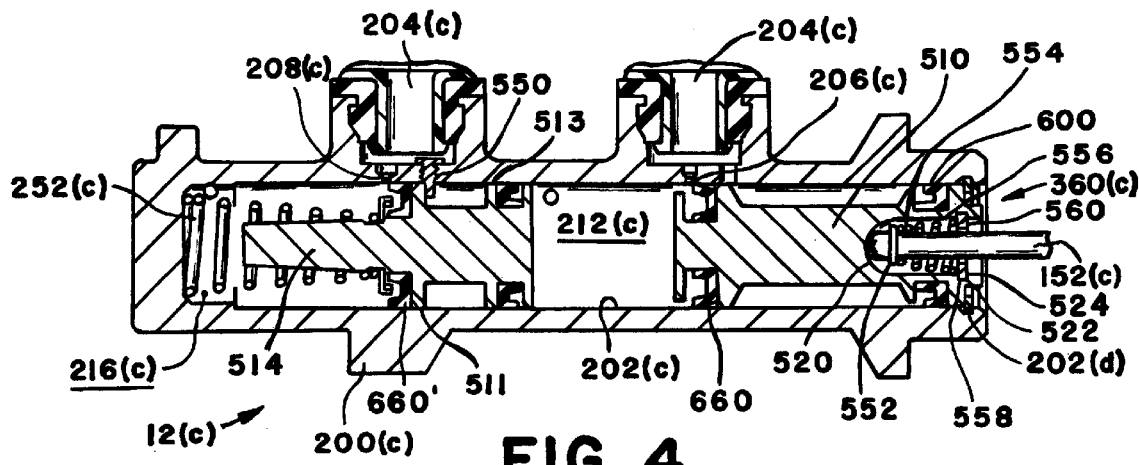
FIG. 4 is a sectional view of a still further embodiment of a master cylinder of the present invention for use in the brake system of FIG. 2.

FIG. 4 is a sectional view of another master cylinder 12c of a type disclosed in U.S. Pat. No. 3,149,468 for use a brake booster 14a in a brake system 10a as illustrated in FIG. 2. In master cylinder 12c, the housing 200c has a bore 202c that is connected to reservoir 204c by compensation port 206c and 208c. The primary piston 510 and secondary piston 514 are similar in that both have a cylindrical body which carry lip seals 600,600'. A return spring 252c in bore 202c urges the secondary piston 514 toward a stop pin 550 to define the second pressure chamber 216c. The second piston 514 has a first shoulder 511 that is separated from a second shoulder 513 to establish a stroke length for the secondary piston 514 within bore 202c. With shoulder 511 of piston 514 in engagement with stop pin 550, a flow communication path is established between compensation port 208c and the secondary pressure chamber 216c. The cylindrical body of the primary piston 510 has a bore 520 for receiving output push rod 152c from the brake booster 14c. The cylindrical body has a groove 522 adjacent the end 524 thereof for receiving a snap ring 560 associated with connection arrangement 360c. The output push rod 152c has a shaft 156c with a shoulder 552 for receiving a first coil 554 of spring 556. On insertion of shaft 156c into bore 520 snap ring 560 engages a second coil 558 on spring 556 and is located in groove 522 to fix the primary piston 510 to the output push rod 152c. The primary piston 510 is retained in bore 202c by a snap ring 202d.

The operation of master cylinder 12c is similar as described with the embodiment of master cylinder 12a described with respect to FIG. 2, in that initial movement of the output push rod 152c moves primary piston 510 such that lip seal 660 moves past compensation port 206c and allows the development of pressurized fluid to start in the first pressure chamber 212c. As the pressure of the fluid in the first pressure chamber 212c increases, the force of return spring 252c is overcome and the secondary piston 514 moves lip seal 660 past compensation port 208c to close communication between chamber 216c and reservoir 204c and begin pressuring fluid in pressure chamber 216c. Thereafter, the operational force supplied through the output push rod 360c moves the primary piston 510 and secondary piston 514 to respectively pressurize fluid in chambers 212c and 216c in effecting a brake application corresponding to the operator input force applied to brake pedal 16c.

On termination of the input force on the brake pedal 16c by an operator, control valve 142c is positioned to terminate communication of the second pressure (atmospheric air) to the rear chamber 110c and reconnect the rear chamber 110c to receive the first fluid pressure (vacuum) to terminate the pressure differential across the movable wall 122c. On termination of the pressure differential, return spring 160c moves the movable wall 122c to the position of rest in the brake booster 14c as illustrated for master cylinder 12a in FIG. 2. Since the primary piston 510 is fixed to the output push rod 152c when return spring 160c moves the movable wall 122 to its position of rest the primary piston 510 is also located in its position of rest. As the primary piston 510 approaches its position of rest, lip seal 660 moves past compensation port 206c to open communication between the first pressure chamber 212c and compensation fluid available in reservoir 204c. As the pressure in the first pressure chamber 212c is lowered, return spring 252c acts on the secondary piston 514 to move secondary piston 514 toward stop pin 550. When lip seal 660' moves past compensation port 208c communication of fluid is available between chamber 216c and reservoir 204c.

Figure 5:
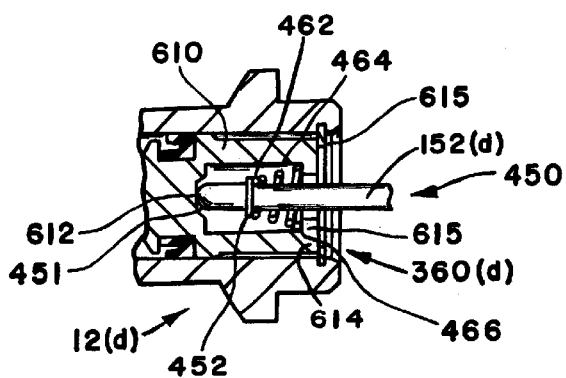
FIG. 5 is a sectional view of another connection for joining a primary piston of a master cylinder with an output push rod of a brake booster of the present invention.

The output push rod 450 as shown in FIG. 5 illustrates another connection arrangement 360d for fixing a primary piston 610 of a master cylinder 12d with a shaft 152d. The primary piston 610 has a cylindrical body with an indentation 612 extending from end 614. Output push rod 450 has a shaft 152d with a spherical surface 451 on the end thereof which is located in indentation 612. A shoulder 452 located on shaft 152d provides a stop for a first coil 462 of a spring 464 of the connection arrangement 360d. The end 614 of the primary piston 610 is rolled or formed into rib 615 to form a stop for a second coil 466 of spring 464 to resiliently join shaft 152d with the primary piston 610.

Figure 6:
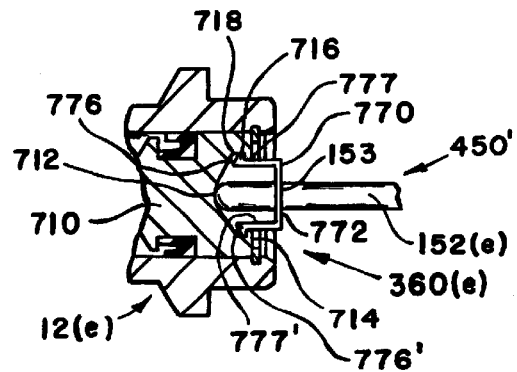
FIG. 6 is a sectional view of a further connection for joining a primary piston of a master cylinder with an output push rod of a brake booster of the present invention.

The output push rod 450' as shown in FIG. 6 illustrates still another connection arrangement 360e for fixing a primary piston 710 of a master cylinder 12e with a shaft 152. The primary piston 710 has a cylindrical body with an indentation 712 extending from end 714 and a radial rib 716 formed on end 714 to define a groove 718. Output push rod 450' has a shaft 152e with a spherical surface on the end thereof which is located in indentation 712. Connection arrangement 360e has a cylindrical body 770 which is located in a groove 153 on shaft 152e and resilient tabs 777,777' that extend from the base 772 of the cylindrical body 770. Tabs 777,777' each have barbs 776,766' that extend therefrom and when located in groove 718 define a locked or fixed join for the primary piston 710 and shaft 152e.

In the above described embodiments, the connection arrangements may be interchanged without affecting the operational function of the invention.

I claim:

1. A brake system for a vehicle having a brake booster for providing a primary piston in a master cylinder with an input force to pressurize fluid which is supplied to wheel brakes of a vehicle to effect a brake application in response to an operator input force, said master cylinder having a first housing with a bore therein, said bore having a first compensation port connected to a fluid supply and a first outlet port connected to said wheel brakes, said primary piston being located in said bore to define an first pressure chamber therein, said primary piston having a first position of rest whereby said first pressure chamber is connected to said fluid supply, said brake booster having a second housing with an interior separated by a movable wall into a front chamber and a rear chamber, said front chamber being connected to a first fluid at a first pressure and said rear chamber being selectively connected to said first fluid and to a second fluid at a second pressure as a function of a force applied to a control valve, a first return spring for positioning said movable wall in a second position of rest whereby said first fluid is communicated to said front and rear chambers and an output push rod connected to said movable wall, said control valve being responsive to an operator input for terminating communication of said first fluid to said rear chamber and initiating communication of said second fluid to said rear chamber for creating an pressure differential across said movable wall, said pressure differential acting on said movable wall to develop an operational force which after overcoming said first return spring moves said movable wall from said second position of rest toward said master cylinder, said operational force being communicated through said output push rod to move said primary piston from said first position of rest past said first compensation port to thereafter pressurize fluid in said first pressure chamber, said pressurized fluid being supplied from said first chamber to said wheel brakes through said first outlet port to effect a brake application, said brake system being characterized by connecting means for joining said primary piston with said output push rod such that said primary piston is moved toward said first position of rest by said return spring returning said movable wall to said second position of rest in an absence of an operator input being applied to said control valve and means for adjusting the position of said primary piston within said bore to assure that said compensation port is fully connected with bore in said first position of rest.

2. The brake system as recited in claim 1 wherein said master cylinder is further characterized by a snap ring, said primary piston engaging said first snap ring to establish said first position of rest.

3. The brake system as recited in claim 2 wherein said master cylinder is further characterized by a secondary piston located in said bore by a stop pin to define a secondary chamber, said bore having a second compensation port for connecting said secondary chamber with said fluid supply, a second return spring for urging said secondary piston into engagement with said second stop pin to connect said second chamber with said source of fluid through said second compensation port.

4. The brake system as recited in claim 3 wherein said secondary piston is characterized by engagement with said stop pin also defines a maximum limit for the movement of said primary and secondary pistons win said bore.

5. The brake system as recited in claim 1 wherein said a maximum stroke for said primary piston is about double a maximum stroke for said secondary piston.

6. A brake system for a vehicle having a brake booster for providing a primary piston in a master cylinder with an input force to pressurize fluid which is supplied to wheel brakes of a vehicle to effect a brake application in response to an operator input force, said master cylinder having a first housing with a bore therein, said bore having a first compensation port connected to a fluid supply and a first outlet port connected to said wheel brakes, said primary piston being located in said bore to define an first pressure chamber therein, said primary piston having a first position of rest whereby said first pressure chamber is connected to said fluid supply, said brake booster having a second housing with an interior separated by a movable wall into a front chamber and a rear chamber, said front chamber being connected to a first fluid at a first pressure and said rear chamber being selectively connected to said first fluid and to a second fluid at a second pressure as a function of a force applied to a control valve, a first return spring for positioning said movable wall in a second position of rest whereby said first fluid is communicated to said front and rear chambers and an output push rod connected to said movable wall, said control valve being responsive to an operator input for terminating communication of said first fluid to said rear chamber and initiating communication of said second fluid to said rear chamber for creating an pressure differential across said movable wall, said pressure differential acting on said movable wall to develop an operational force which after overcoming said first return spring moves said movable wall from said second position of rest toward said master cylinder, said operational force being communicated through said output push rod to move said primary piston from said first position of rest past said first compensation port to thereafter pressurize fluid in said first pressure chamber, said pressurized fluid being supplied from said first chamber to said wheel brakes through said first outlet port to effect a brake application, said brake system being characterized by connecting means for joining said primary piston with said output push rod such that said primary piston is moved toward said first position of rest by said return spring returning said movable wall to said second position of rest in an absence of an operator input being applied to said control valve and a cylindrical body fixed to said output push rod, said cylindrical body having a plurality of resilient hooks that engage a projection that extends from said primary piston to provide a solid link between said primary piston and said output push rod.

7. A brake system for a vehicle having a brake booster for providing a primary piston in a master cylinder with an input force to pressurize fluid which is supplied to wheel brakes of a vehicle to effect a brake application in response to an operator input force, said master cylinder having a first housing with a bore therein, said bore having a first compensation port connected to a fluid supply and a first outlet port connected to said wheel brakes, said primary piston being located in said bore to define an first pressure chamber therein, said primary piston having a first position of rest whereby said first pressure chamber is connected to said fluid supply, said brake booster having a second housing with an interior separated by a movable wall into a front chamber and a rear chamber, said front chamber being connected to a first fluid at a first pressure and said rear chamber being selectively connected to said first fluid and to a second fluid at a second pressure as a function of a force applied to a control valve, a first return spring for positioning said movable wall in a second position of rest whereby said first fluid is communicated to said front and rear chambers and an output push rod connected to said movable wall, said control valve being responsive to an operator input for terminating communication of said first fluid to said rear chamber and initiating communication of said second fluid to said rear chamber for creating an pressure differential across said movable wall, said pressure differential acting on said movable wall to develop an operational force which after overcoming said first return spring moves said movable wall from said second position of rest toward said master cylinder, said operational force being communicated through said output push rod to move said primary piston from said first position of rest past said first compensation port to thereafter pressurize fluid in said first pressure chamber, said pressurized fluid being supplied from said first chamber to said wheel brakes through said first outlet port to effect a brake application, said brake system being characterized by connecting means for joining said primary piston with said output push rod such that said primary piston is moved toward said first position of rest by said return spring returning said movable wall to said second position of rest in an absence of an operator input being applied to said control valve, said master cylinder having a first stop pin, said primary piston engaging said first stop pin to establish said first position of rest.

8. A brake system for a vehicle having a brake booster for providing a primary piston in a master cylinder with an input force to pressurize fluid which is supplied to wheel brakes of a vehicle to effect a brake application in response to an operator input force, said master cylinder having a first housing with a bore therein, said bore having a first compensation port connected to a fluid supply and a first outlet port connected to said wheel brakes, said primary piston being located in said bore to define an first pressure chamber therein, said primary piston having a first position of rest whereby said first pressure chamber is connected to said fluid supply, said brake booster having a second housing with an interior separated by a movable wall into a front chamber and a rear chamber, said front chamber being connected to a first fluid at a first pressure and said rear chamber being selectively connected to said first fluid and to a second fluid at a second pressure as a function of a force applied to a control valve, a first return spring for positioning said movable wall in a second position of rest whereby said first fluid is communicated to said front and rear chambers and an output push rod connected to said movable wall, said control valve being responsive to an operator input for terminating communication of said first fluid to said rear chamber and initiating communication of said second fluid to said rear chamber for creating an pressure differential across said movable wall, said pressure differential acting on said movable wall to develop an operational force which after overcoming said first return spring moves said movable wall from said second position of rest toward said master cylinder, said operational force being communicated through said output push rod to move said primary piston from said first position of rest past said first compensation port to thereafter pressurize fluid in said first pressure chamber, said pressurized fluid being supplied from said first chamber to said wheel brakes through said first outlet port to effect a brake application, said brake system being characterized by connecting means for joining said primary piston with said output push rod such that said primary piston is moved toward said first position of rest by said return spring returning said movable wall to said second position of rest in an absence of an operator input being applied to said control valve, said master cylinder having a secondary piston that is located in said bore by a second stop pin to define a secondary chamber, said bore having a second compensation port for connecting said secondary chamber with said fluid supply, a second return spring for urging said secondary piston into engagement with said second stop pin to connect said secondary chamber with said source of supply fluid through said second compensation port.

9. The brake system as recited in claim 8 wherein said movement of said primary piston in said first chamber pressurizes fluid therein that acts on said secondary piston to move said secondary piston in said second chamber and pressurize fluid therein that is communicated to said wheel brakes to assist in effecting said brake application.

10. A brake system for a vehicle having a brake booster with an output put rod for providing a primary piston in a master cylinder with an input force to pressurize fluid which is supplied to wheel brakes of a vehicle to effect a brake application in response to an operator input force, said master cylinder having a first housing with a bore therein for retaining said primary piston in a first pressure chamber, said bore having a first compensation passage connected to a fluid supply and a first outlet port connected to said wheel brakes, said primary piston having a first position of rest whereby said first pressure chamber is connected to a fluid supply through said first compensation passage, said brake booster having a second housing with an interior separated by a movable wall into a front chamber and a rear chamber, a first return spring for urging said movable wall to a second position of rest, a control valve responsive to said operator input force for connected said rear chamber with a fluid pressure to create a pressure differential across said movable wall to develop an operational force which overcomes said first return spring (160a) and provide said primary piston with said input force to move said primary piston past said compensation passage to thereafter pressurize fluid in said first chamber which is supplied to effect said brake application, said brake system being characterized by connecting means for joining said primary piston with said output push rod such that said primary piston is moved to said first position of rest by said return spring returning said movable wall to said second position of rest in an absence of an operator input being applied to said control valve, said connecting means including means for adjusting the position of said primary piston within said bore to assure that said compensation port is fully connected with bore in said first position of rest.

11. The brake system as recited in claim 10 wherein said connection means is further characterized by a body fixed to said output push rod having a plurality of resilient hooks that engage a projection that extends from said primary piston to provide a solid link between said primary piston and said output push rod.

12. The brake system as recited in claim 10 wherein said master cylinder is further characterized by a first stop pin which extends through said primary piston to establish said first position of rest.

13. The brake system as recited in claim 12 wherein said master cylinder is further characterized by a secondary piston located in said bore by a second stop pin to define a secondary chamber, said bore having a second compensation port for connecting said secondary chamber with said fluid supply, a second return spring for urging said secondary piston into engagement with said second stop pin to connect said second chamber with said source of fluid supply through said second compensation port.

14. The brake system as recited in claim 13 wherein said movement of said primary piston in said first chamber pressurizes fluid therein which acts on said secondary piston to move said secondary piston in said second chamber and pressurize fluid therein which is communicated to said wheel brakes to assist in effecting said brake application.

15. The brake system as recited in claim 10 wherein said master cylinder is further characterized by a secondary piston located in said bore by a stop pin to define a secondary chamber, said bore having a second compensation port for connecting said secondary chamber with said fluid supply, a second return spring for urging said secondary piston into engagement with said second stop pin to connect said secondary chamber with said source of fluid supply through said second compensation port.

16. The brake system as recited in claim 15 wherein said secondary piston is characterized by engagement with said stop pin to also define a maximum limit for the movement of said primary and secondary pistons within said bore.

17. The brake system as recited in claim 10 wherein said primary piston is characterized by a maximum stroke that is about double a maximum stroke for said secondary piston.

* * * * *